(12) United States Patent
Sakai et al.

(10) Patent No.: US 11,710,314 B2
(45) Date of Patent: Jul. 25, 2023

(54) RECORD-AND-REPLAY CONTROL DEVICE, REPLAY CONTROL DEVICE, AND RECORD-AND-REPLAY CONTROL METHOD

(71) Applicant: JVCKENWOOD Corporation, Yokohama (JP)

(72) Inventors: Yasutoshi Sakai, Yokohama (JP); Keita Hayashi, Yokohama (JP); Hirofumi Taniyama, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 16 days.

(21) Appl. No.: 17/355,360

(22) Filed: Jun. 23, 2021

(65) Prior Publication Data
US 2021/0319224 A1  Oct. 14, 2021

Related U.S. Application Data

(63) Continuation of application No. PCT/JP2019/042367, filed on Oct. 29, 2019.

(30) Foreign Application Priority Data

Feb. 26, 2019 (JP) .................................. 2019-033342

(51) Int. Cl.
*G06V 20/40* (2022.01)
*G06F 16/74* (2019.01)
*G06V 20/56* (2022.01)

(52) U.S. Cl.
CPC ............ *G06V 20/40* (2022.01); *G06F 16/743* (2019.01); *G06V 20/56* (2022.01); *G06V 20/44* (2022.01)

(58) Field of Classification Search
CPC ....... G06V 20/40; G06V 20/56; G06F 16/743
See application file for complete search history.

(56) References Cited

U.S. PATENT DOCUMENTS

| 2007/0067079 A1* | 3/2007 | Kosugi | G07C 5/085 |
| | | | 348/148 |
| 2010/0134264 A1* | 6/2010 | Nagamine | B60Q 9/005 |
| | | | 348/113 |
| 2022/0012810 A1* | 1/2022 | Brandmaier | G06Q 40/08 |

FOREIGN PATENT DOCUMENTS

| JP | 2010028537 A * | 2/2010 |
| JP | 2018-082391 | 5/2018 |

OTHER PUBLICATIONS

International Search Report and Written Opinion for International Application No. PCT/JP2019/042367 dated Jan. 21, 2020, 8 pages.

(Continued)

*Primary Examiner* — Girumsew Wendmagegn
(74) *Attorney, Agent, or Firm* — Amin, Turocy & Watson, LLP

(57) ABSTRACT

A record-and-replay control device includes a video data acquisition unit configured to acquire video data from an imaging unit to capture an image of outside of a vehicle; an event detector configured to detect an event of the vehicle; an event detection direction acquisition unit configured to acquire an event detection direction of the event; a recording controller configured to store video data caused by the detected event as event recording data with a first angle of view; a replay controller configured to replay selected event recording data; and a display controller configured to control a display unit to display, out of thumbnail images of the stored event recording data, a thumbnail image indicating the event recording data to which the event detection direc- (Continued)

tion is correlated, as a thumbnail image obtained by adopting a second angle of view with enlargement in the event detection direction.

6 Claims, 14 Drawing Sheets

(56) References Cited

OTHER PUBLICATIONS

Japanese Decision to Grant a Patent for Japanese Patent Application No. 2019-033342 dated Aug. 18, 2020.

* cited by examiner

… (US 11,710,314 B2)

RECORD-AND-REPLAY CONTROL DEVICE, REPLAY CONTROL DEVICE, AND RECORD-AND-REPLAY CONTROL METHOD

CROSS-REFERENCE TO RELATED APPLICATION

This application is a Continuation of PCT International Application No. PCT/JP2019/042367 filed on Oct. 29, 2019 which claims the benefit of priority from Japanese Patent Application No. 2019-033342 filed on Feb. 26, 2019, the entire contents of which are incorporated herein by reference.

BACKGROUND

1. Technical Field

The present invention relates to a record-and-replay control device, a replay control device, and a record-and-replay control method.

2. Description of the Related Art

A vehicle record-and-replay device that detects an event to a vehicle, records video data, and replays the recorded video data to enable checking of a state of the event has been known (for example, see JP-A-2018-082391).

In order to capture an image in a wide range around the vehicle, the video data formed by recording the event is provided by capturing with an angle of view of, for example, equal to or more than about 100° with respect to the horizontal direction or the whole circumference of the vehicle. When desired video data is selected from thumbnail images based on the pieces of video data thus provided by capturing with the wide angle of view, it may be difficult to find the desired video data because capturing target objects reflected on the thumbnail images are displayed to be small. There is a room for improvement in checking of the state of the event as described above.

SUMMARY

A record-and-replay control device according to an embodiment includes a video data acquisition unit, an event detector, an event detection direction acquisition unit, a recording controller, a replay controller, and a display controller. The video data acquisition unit is configured to acquire video data captured by an imaging unit configured to capture an image of outside of a vehicle. The event detector is configured to detect an event with respect to the vehicle. The event detection direction acquisition unit is configured to acquire an event detection direction of the event detected by the event detector with respect to the vehicle. The recording controller is configured to, when the event detector detects an event, store video data caused by the detected event as event recording data that is captured by the imaging unit with a first angle of view. The replay controller is configured to replay selected event recording data. The display controller is configured to control a display unit to display, out of thumbnail images indicating pieces of the event recording data stored by the recording controller, a thumbnail image indicating the event recording data to which the event detection direction is correlated, as a thumbnail image obtained by adopting a second angle of view with enlargement in the event detection direction detected by the event detection direction acquisition unit, and controls the display unit to display the replayed event recording data.

A replay control device according to an embodiment includes a replay controller and a display controller. The replay controller is configured to acquire event recording data based on video data captured with a first angle of view by an imaging unit configured to capture an image of outside of a vehicle based on an event that has occurred to the vehicle and information indicating an event detection direction of the event recording data, and replay selected event recording data. The display controller is configured to control a display unit to display, out of thumbnail images indicating pieces of the event recording data, a thumbnail image indicating the event recording data to which the event detection direction is correlated, as a thumbnail image obtained by adopting a second angle of view with enlargement in the event detection direction, and controls the display unit to display the event recording data replayed by the replay controller.

A record-and-replay control method according to an embodiment includes: acquiring video data captured by an imaging unit configured to capture an image of outside of a vehicle; detecting an event with respect to the vehicle; acquiring an event detection direction of the event detected at the detecting; storing, when the event is detected at the detecting, video data caused by the detected event as event recording data that is captured by the imaging unit with a first angle of view; displaying, on a display unit, out of thumbnail images indicating pieces of the event recording data stored at the storing, a thumbnail image indicating the event recording data to which the event detection direction is correlated, as a thumbnail image obtained by adopting a second angle of view with enlargement in the event detection direction detected at the acquiring; replaying the event recording data corresponding to a selected thumbnail image; and displaying, on the display unit, the event recording data replayed at the replaying.

DETAILED DESCRIPTION

Hereinafter, embodiments of a record-and-replay control device, a replay control device, a record-and-replay control method, and a computer program will be described in detail with reference to the accompanying drawings. The following embodiments do not limit the present invention.

First Embodiment

Figure 1:
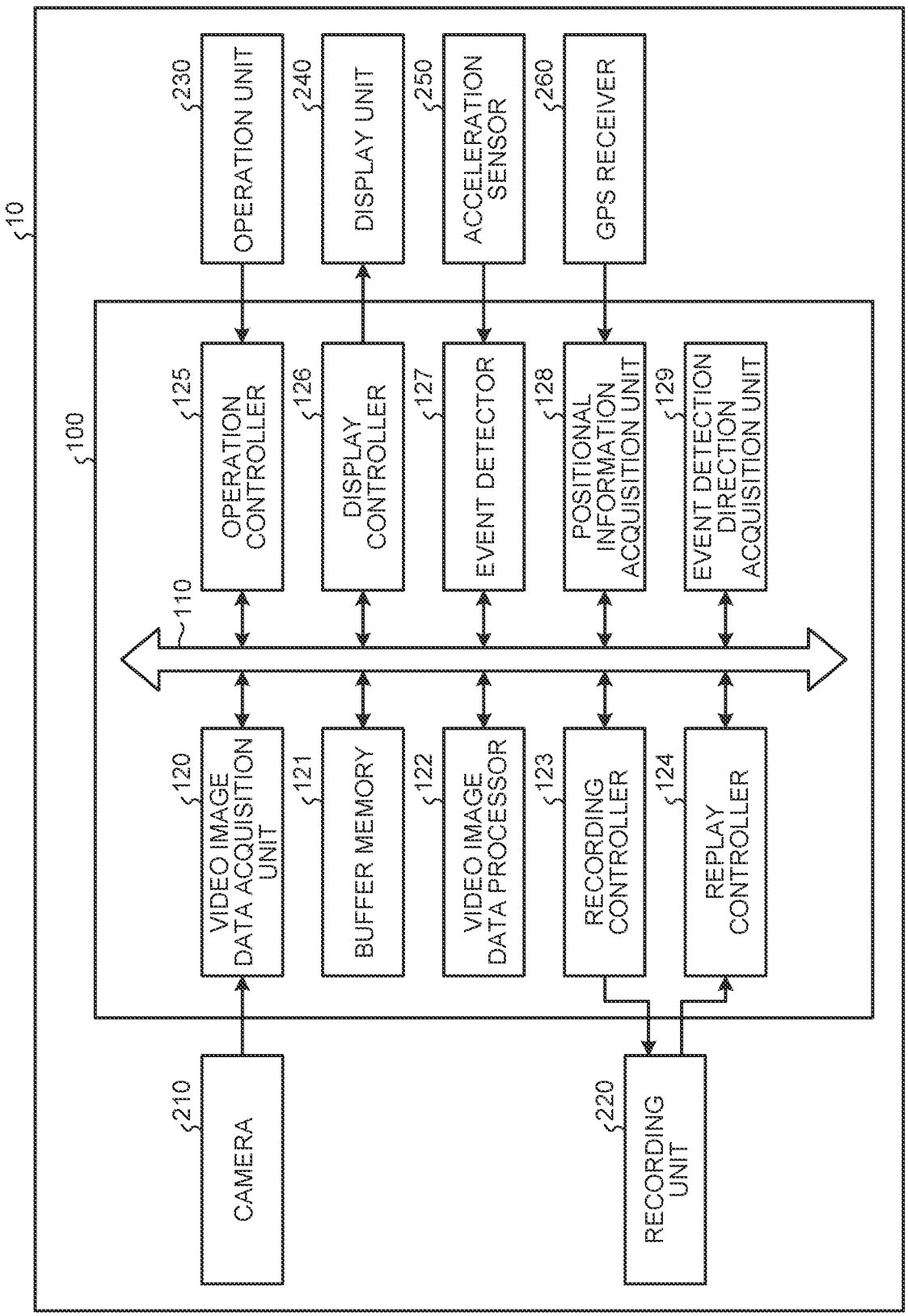
FIG. 1 is a block diagram illustrating an example of the configuration of a vehicle record-and-replay device including a record-and-replay control device according to a first embodiment.
Figure 2:
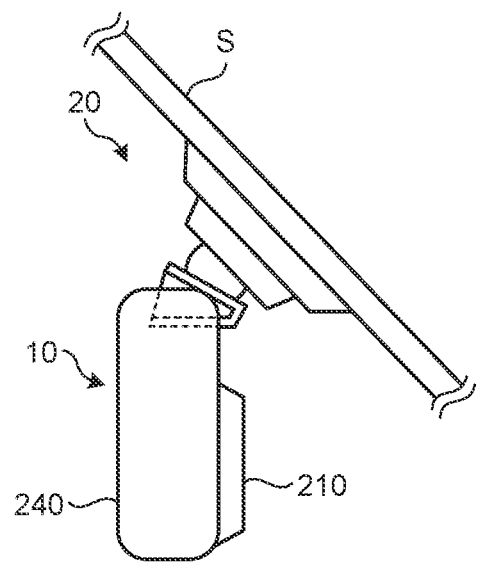
FIG. 2 is a side view illustrating the vehicle record-and-replay device.
Figure 3:
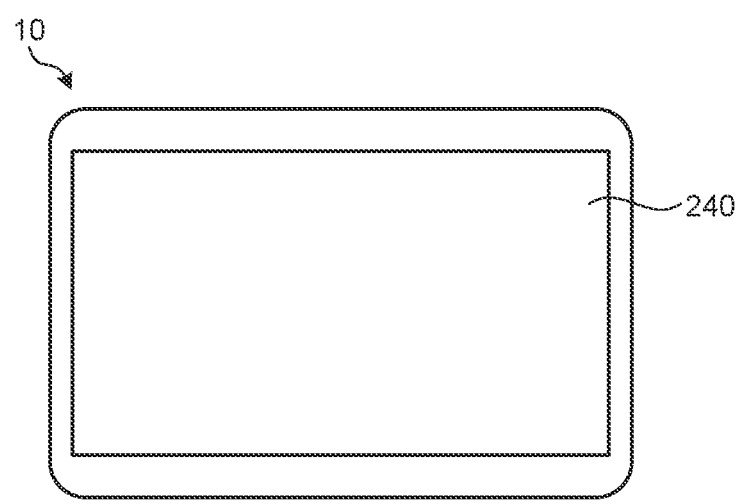
FIG. 3 is a front view illustrating the vehicle record-and-replay device.

FIG. 1 is a block diagram illustrating an example of the configuration of a vehicle record-and-replay device including a record-and-replay control device according to a first embodiment. FIG. 2 is a side view illustrating the vehicle record-and-replay device. FIG. 3 is a front view illustrating the vehicle record-and-replay device. A vehicle record-and-replay device 10 displays a thumbnail image obtained by adopting a second angle of view with enlargement in an event detection direction, the second angle of view being narrower than a first angle of view, a thumbnail image of event recording data with the first angle of view that is formed by recording an event.

The vehicle record-and-replay device 10 is what is called a dashboard camera and may be a device installed in a vehicle or a portable device capable of being used in the vehicle. In the embodiment, as illustrated in FIG. 2, the vehicle record-and-replay device 10 is fixed to a window shield S through a bracket 20. The vehicle record-and-replay device 10 includes a camera (imaging unit) 210, a recording unit 220, an operation unit 230, a display unit 240, an acceleration sensor 250, a global positioning system (GPS) receiver 260, and a record-and-replay control device 100.

The camera 210 captures an image of outside of the vehicle. In the embodiment, the camera 210 can capture images in a range of equal to or more than about 100° and equal to or less than about 130° with respect to the horizontal direction and equal to or more about than 55° and equal to or less than 75° with respect to the up-down direction for description. The camera 210 is not, however, limited thereto and may be a camera capable of capturing images of the whole circumference of 360° or a group of a plurality of cameras capturing respective directions. As illustrated in FIG. 2, the camera 210 is arranged in, for example, a front portion in a cabin of the vehicle. The camera 210 captures a video all the time from the start of an engine to the stop thereof, that is, while the vehicle is operated. In the embodiment, the camera 210 captures the video all the time while an accessory power supply of the vehicle is in an ON state. In the embodiment, the camera 210 starts capturing of a video when an event is detected in an OFF state of the accessory power supply, in other words, during parking of the vehicle. The camera 210 outputs captured video data to a video data acquisition unit 120 of the record-and-replay control device 100. The video data is a moving image formed by images of 30 frames per second, for example. The angle of view of the captured video data is assumed to be the first angle of view.

The recording unit 220 is used for temporarily storing data in the vehicle record-and-replay device 10, and so on. The recording unit 220 is, for example, a semiconductor memory device such as a random-access memory (RAM) and a flash memory or a memory card. Alternatively, the recording unit 220 may be an external recording unit that is wirelessly connected to the vehicle record-and-replay device 10 via a communication device (not illustrated). The recording unit 220 records event recording data or loop recording data based on a control signal output from a recording controller 123 of the record-and-replay control device 100.

The operation unit 230 can receive various operations on the vehicle record-and-replay device 10. For example, the operation unit 230 can receive an operation of manually storing the captured video data in the recording unit 220. For example, the operation unit 230 can receive an operation of replaying the event recording data or the loop recording data recorded in the recording unit 220. For example, the operation unit 230 can receive an operation of deleting the event recording data recorded in the recording unit 220. For example, the operation unit 230 can receive an operation of finishing loop recording. The operation unit 230 outputs operation information to an operation controller 125 of the record-and-replay control device 100.

The operation unit 230 is a touchscreen included in the display unit 240. The operation of replaying the event recording data stored in the recording unit 220 is performed by touching a list or the like of the pieces of event recording data displayed on the display unit 240 for instruction to select and replay the event recording data. The list of the pieces of event recording data is displayed in form of thumbnail images.

The display unit 240 is, as an example, a display device unique to the vehicle record-and-replay device 10 or a display device shared with another system including a navigation system. The display unit 240 is, for example, a display including a liquid crystal display (LCD) or an organic electro-luminescence (EL) display. In the embodiment, as illustrated in FIG. 2 and FIG. 3, the display unit 240 is formed integrally with the camera 210. The display unit 240 displays a video based on a video signal output from a display controller 126 of the record-and-replay control device 100. The display unit 240 displays a video captured by the camera 210 or a video recorded in the recording unit 220.

The acceleration sensor 250 detects acceleration applied to the vehicle. The acceleration sensor 250 outputs a detection result to an event detector 127 of the record-and-replay control device 100. The acceleration sensor 250 detects accelerations in three axial directions, for example. The three axial directions are a front-back direction, a right-left direction, and an up-down direction of the vehicle. Impact to the vehicle can be detected by the accelerations in the three axial directions.

The GPS receiver 260 receives radio waves from a GPS satellite (not illustrated). The GPS receiver 260 outputs a signal of the received radio waves to a positional information acquisition unit 128 of the record-and-replay control device 100.

The record-and-replay control device 100 is, for example, an arithmetic processing device (control device) configured by a central processing unit (CPU) or the like. The record-and-replay control device 100 loads a stored computer program on a memory and executes instructions contained in the computer program. The record-and-replay control device 100 includes an internal memory (not illustrated), and the internal memory is used for temporarily storing data in the record-and-replay control device 100. The record-and-replay control device 100 includes the video data acquisition unit 120, a buffer memory 121, a video data processor 122, the recording controller 123, a replay controller 124, the operation controller 125, the display controller 126, the event detector 127, the positional information acquisition unit 128, and an event detection direction acquisition unit 129, each connected to a bus 110.

The video data acquisition unit 120 acquires video data provided by capturing images of the surrounding of the vehicle. To be more specific, the video data acquisition unit 120 acquires the video data output from the camera 210.

The buffer memory 121 is the internal memory included in the record-and-replay control device 100 and temporarily records therein the video data for a constant period of time that the video data acquisition unit 120 has acquired while updating it.

The video data processor 122 converts the video data that the buffer memory 121 temporarily stores therein into any file format such as an MP4 format coded by a codec of any system such as H.264 and moving picture experts group (MPEG-4). The video data processor 122 generates video data as a file for a constant period of time from the video data that the buffer memory 121 temporarily stores therein. As a specific example, the video data processor 122 uses the video data that the buffer memory 121 temporarily stores therein to generate video data for 60 seconds as one file in the recording order. The video data processor 122 outputs the generated video data to the recording controller 123. The video data processor 122 outputs the generated video data to the display controller 126. The period of the video data to be generated as the file is 60 seconds as an example but is not limited thereto. The video data referred herein may be data with audio in addition to a video captured by the camera 210.

The recording controller 123 controls to record, in the recording unit 220, the video data generated as the file by the video data processor 122. The recording controller 123 controls to record, in the recording unit 220, the pieces of video data generated as the files by the video data processor 122 as pieces of rewritable video data during a period in which loop recording processing is executed as in a period in which an accessory power supply of the vehicle is in an ON state. To be more specific, the recording controller 123 keeps recording, in the recording unit 220, the pieces of video data generated by the video data processor 122 during the period in which the loop recording processing is executed. When the capacity of the recording unit 220 becomes full, the recording controller 123 replaces the oldest video data by new video data for recording.

When the event detector 127 detects an event, the recording controller 123 stores, in the recording unit 220, video data for a predetermined period among the pieces of video data generated by the video data processor 122 as event recording data that is prohibited to be replaced.

When the event detector 127 detects the event, the recording controller 123 stores video data caused by the detected event as event recording data with the first angle of view that is captured by the camera 210. When the recording controller 123 acquires, from the event detection direction acquisition unit 129, information indicating the event detection direction corresponding to a target event for which the video data is recorded as the event recording data, it stores, in the recording unit 220, the event recording data and the information indicating the event detection direction in a correspondence manner.

The video data caused by the detected event is video data for a predetermined period before and after the time point at which the event is detected during the period in which the loop recording processing is executed. The predetermined period is, for example, about equal to or more than 10 seconds and equal to or less than 60 seconds before and after the time point at which the event is detected. The video data caused by the detected event is video data until a predetermined period has passed from the start of capturing after the event is detected when the loop recording processing is not executed and capturing is started after the event is detected. The predetermined period is, for example, about equal to or more than 10 seconds and equal to or less than 60 seconds.

The replay controller 124 replays the event recording data or the loop recording data corresponding to a selected thumbnail image. The replay controller 124 controls to replay the event recording data or the loop recording data recorded in the recording unit 220 based on a control signal of the selection operation and the replay operation, the control signal being output from the operation controller 125. When the information indicating the event detection direction corresponding to the selected event recording data is present, the replay controller 124 outputs, to the display controller 126, the information indicating the event detection direction.

When the event recording data selected using the thumbnail image displayed with the second angle of view is replayed, the replay controller 124 may control to replay it with the second angle of view.

The operation controller 125 acquires operation information of an operation received by the operation unit 230. For example, the operation controller 125 acquires storing operation information indicating a manual storing operation of the video data, selection operation information indicating a selection operation of the video data, replay operation information indicating a replay operation of the video data, or deletion operation information indicating a deletion operation of the video data, and outputs a control signal. For example, the operation controller 125 acquires finish operation information indicating an operation of finishing the loop recording and outputs a control signal. For example, the operation controller 125 acquires selection operation information indicating a selection operation of a thumbnail image displayed on the display unit 240 and outputs a control signal.

The display controller 126 controls display of the video data on the display unit 240. The display controller 126 outputs a video signal to cause the display unit 240 to output the video data. To be more specific, the display controller 126 outputs the video signal for displaying, by replay, the video that is captured by the camera 210 or the event recording data or the loop recording data recorded in the recording unit 220.

The display controller 126 controls display, on the display unit 240, of thumbnail images indicating the pieces of event recording data or loop recording data recorded in the recording unit 220. When the (pieces of) event recording data or loop recording data as a replay target(s) is present, the display controller 126 controls to display, on the display unit 240, equal to or more than one thumbnail image indicating the (pieces of) data. When the selection operation and the replay operation using the displayed thumbnail image are performed, the display controller 126 controls display of the event recording data or the loop recording data corresponding to the selected thumbnail image.

The display controller 126 controls to display, on the display unit 240, the thumbnail image indicating the loop recording data as a thumbnail image with the first angle of view. The display controller 126 controls to display, on the display unit 240, the replayed loop recording data.

The display controller 126 controls the display unit 240 to display, out of thumbnail images indicating the pieces of event recording data, a thumbnail image indicating the event recording data to which the event detection direction is correlated, as a thumbnail image obtained by the second angle of view, narrower than the first angle of view, with enlargement in the event detection direction detected by the event detection direction acquisition unit 129. The display controller 126 controls the display unit 240 to display the replayed event recording data.

The second angle of view is, for example, equal to or less than about 90° with respect to the horizontal direction and equal to or less than about 50° with respect to the up-down direction. The thumbnail image with the second angle of view and the thumbnail image with the first angle of view differ from each other in the angle of view to an extent that a user can recognize the difference. A position of a center point in the right-left direction in the thumbnail image with the second angle of view deviates in the right direction or the left direction as the event detection direction from that in the thumbnail image with the first angle of view. A position of a center point in the up-down direction in the thumbnail image with the second angle of view may be the same as that in the thumbnail image with the first angle of view or may deviate in the up direction or the down direction from that. The thumbnail image with the second angle of view and the thumbnail image with the first angle of view may be set such that the heights of vanishing points, the heights of horizon, or the heights of reference objects such as a part of buildings or guardrails reflected in the images are the same.

When replay of the event recording data displayed as the thumbnail image with the second angle of view is instructed, the display controller 126 may control to display the replayed event recording data with the second angle of view on the display unit 240.

When the event detection direction has not been acquired, the display controller 126 controls to display, on the display unit 240, the thumbnail image with the first angle of view and display, on the display unit 240, the replayed event recording data with the first angle of view.

Figure 4:
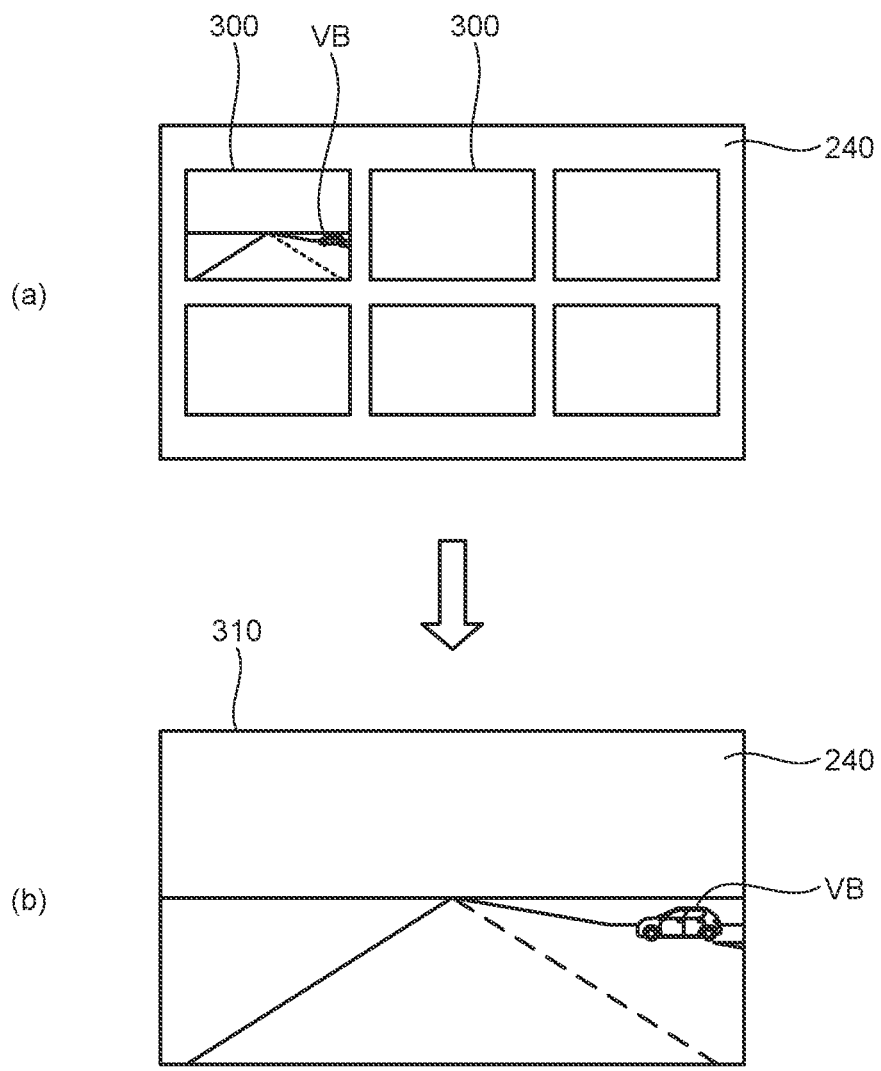
FIG. 4 is a view illustrating an example of thumbnail images and an example of event recording data displayed on a display unit.

Thumbnail images 300 and event recording data 310 that are displayed on the display unit 240 by the display controller 126 when the event detection direction has not been acquired will be described with reference to FIG. 4. FIG. 4 is a view illustrating an example of the thumbnail images and an example of the event recording data displayed on the display unit 240. As illustrated in FIG. 4(a), the display controller 126 controls to display, on the display unit 240, thumbnail images indicating the pieces of event recording data 310 for which the event detection direction has not been acquired (hereinafter, referred to as "thumbnail images with no event detection direction") as the thumbnail images 300 with the first angle of view. With a replay instruction in a state where the thumbnail image 300 at an upper left position in (a) of FIG. 4 is selected, as illustrated in (b) of FIG. 4, when the event recording data 310 corresponding to the selected thumbnail image 300 is replayed, the display controller 126 controls to display, on the display unit 240, the event recording data 310 with the first angle of view.

Figure 5:
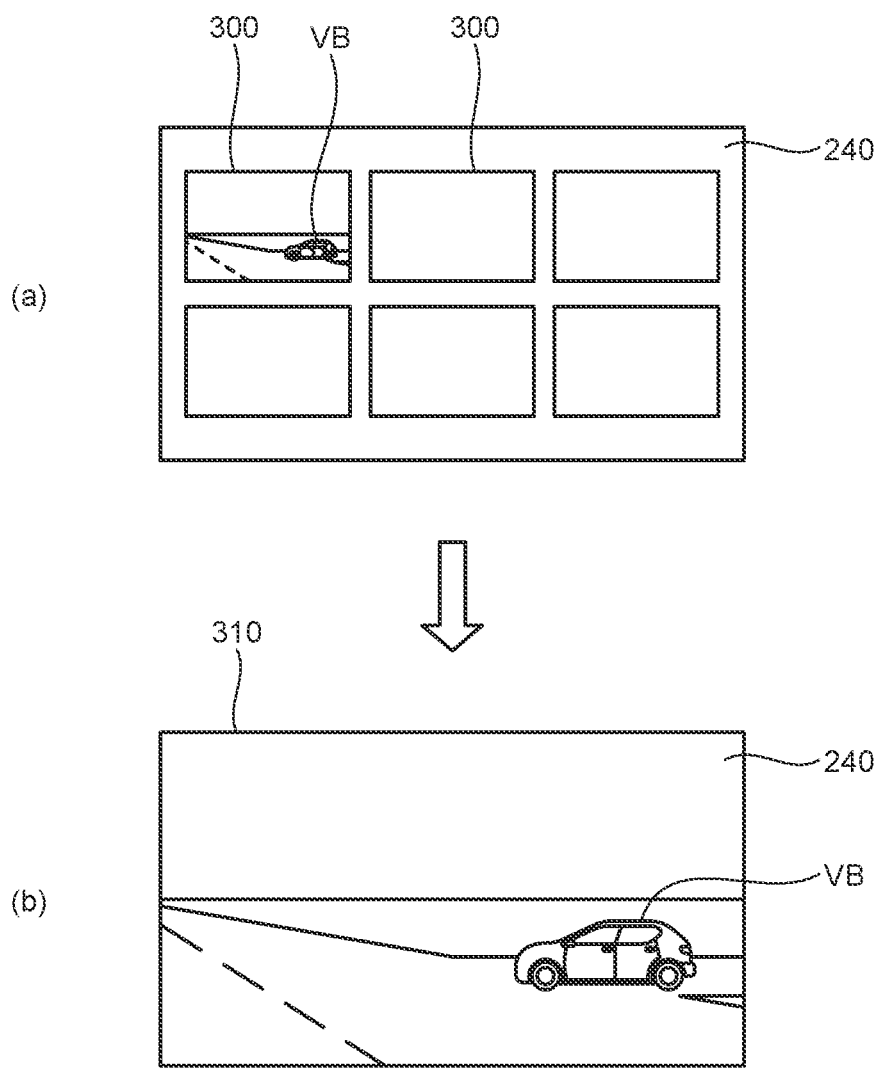
FIG. 5 is a view illustrating another example of the thumbnail images and another example of the event recording data displayed on the display unit.

The thumbnail images 300 and the event recording data 310 that are displayed on the display unit 240 by the display controller 126 when the event detection direction has been acquired will be described with reference to FIG. 5. FIG. 5 is a view illustrating another example of the thumbnail images and another example of the event recording data displayed on the display unit, and illustrate the examples when the right direction of the vehicle is the event detection direction. As illustrated in (a) of FIG. 5, the display controller 126 controls to display, on the display unit 240, thumbnail images indicating the pieces of event recording data 310 for which the event detection direction has been acquired (hereinafter, referred to as "thumbnail images with the event detection direction") as the thumbnail images 300 obtained by adopting the second angle of view with enlargement in the event detection direction. The thumbnail image 300 at an upper left position in (a) of FIG. 5 is displayed with an angle of view narrower than that of the thumbnail image 300 at the upper left position in (a) of FIG. 4. With a replay instruction in a state where the thumbnail image 300 with the event detection direction at the upper left position in (a) of FIG. 5 is selected, as illustrated in (b) of FIG. 5, the display controller 126 controls to display, on the display unit 240, the replayed event recording data 310 corresponding to the selected thumbnail image 300 with the second angle of view. The event recording data 310 in (b) of FIG. 5 is displayed with an angle of view narrower than the event recording data 310 in (b) of FIG. 4.

The event detector 127 detects an event with respect to the vehicle. The event detector 127 may employ any method for detecting the event with respect to the vehicle. As an example, the event detector 127 detects the event based on the detection result of the acceleration sensor 250. In this case, when the acceleration equal to or higher than a threshold is detected by the acceleration sensor 250, the event detector 127 detects it as the event. The threshold for the acceleration that the event detector 127 detects as the event is set so as to detect impact on the vehicle.

The positional information acquisition unit 128 calculates current positional information of the vehicle by a well-known method based on radio waves received by the GPS receiver 260. The positional information calculated by the positional information acquisition unit 128 is stored together with the event recording data when the event detector 127 detects the event.

When the event detector 127 detects the event, the event detection direction acquisition unit 129 acquires the event detection direction with respect to the vehicle. The event detection direction acquisition unit 129 outputs, to the recording controller 123, information indicating the acquired event detection direction.

Figure 6:
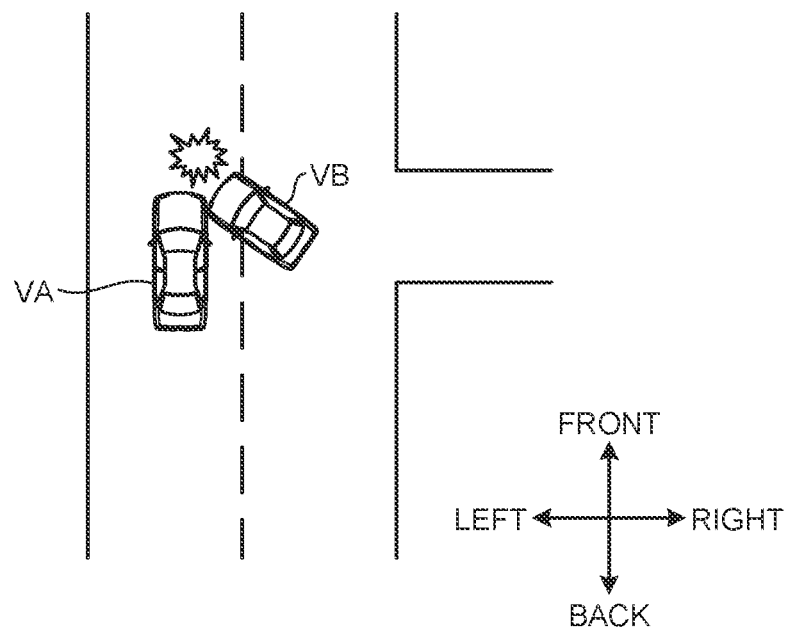
FIG. 6 is a view for explaining an event detection direction.
Figure 7:
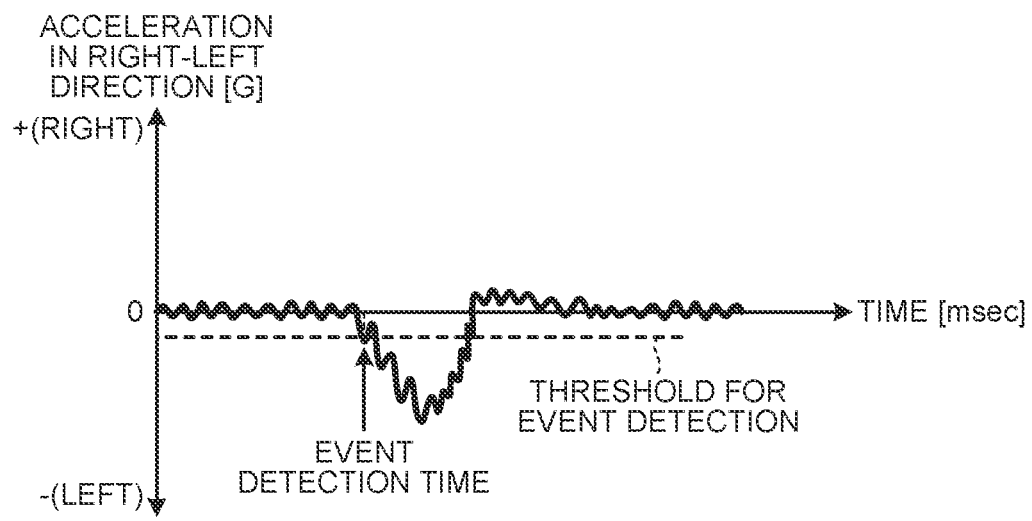
FIG. 7 is a graph for explaining the event detection direction and illustrates a detection result of an acceleration sensor before and after a time point at which an event is detected.
Figure 8:
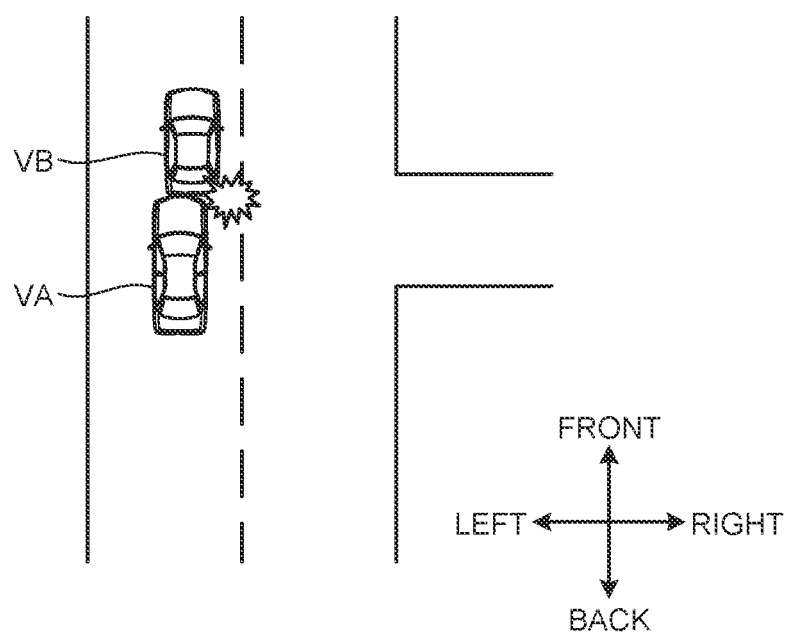
FIG. 8 is a view for explaining the event detection direction.

The event detection direction will be described with reference to FIG. 6 to FIG. 8. FIG. 6 is a view for explaining the event detection direction. FIG. 7 is a graph for explaining the event detection direction and illustrates a detection result of the acceleration sensor before and after a time point at which the event is detected. FIG. 8 is a view for explaining the event detection direction. For example, as illustrated in FIG. 6, a case in which a vehicle VB collides with an own vehicle VA traveling straight from the right side of the own vehicle VA is described. The own vehicle VA subjected to collision by the vehicle VB from the right side is pushed to the left side. As illustrated in FIG. 7, as for the acceleration that is applied to the own vehicle VA in the right-left direction, when the acceleration that is applied to the right direction of the vehicle around the event detection time point is assumed to be acceleration in a positive direction, the acceleration in a negative direction, in other words, the acceleration in the left direction is increased. The increase in the acceleration in the left direction shows that an object such as the vehicle VB collides with the right direction of the own vehicle VA. The event detection direction that is detected in this case is the right direction. For example, as illustrated in FIG. 8, the case in which the vehicle VB collides with the front right side of the own vehicle VA is described. Also in this case, as for the acceleration that is applied to the own vehicle VA in the right-left direction, the acceleration in the left direction is increased, and the event detection direction is therefore the right direction.

Figure 9:
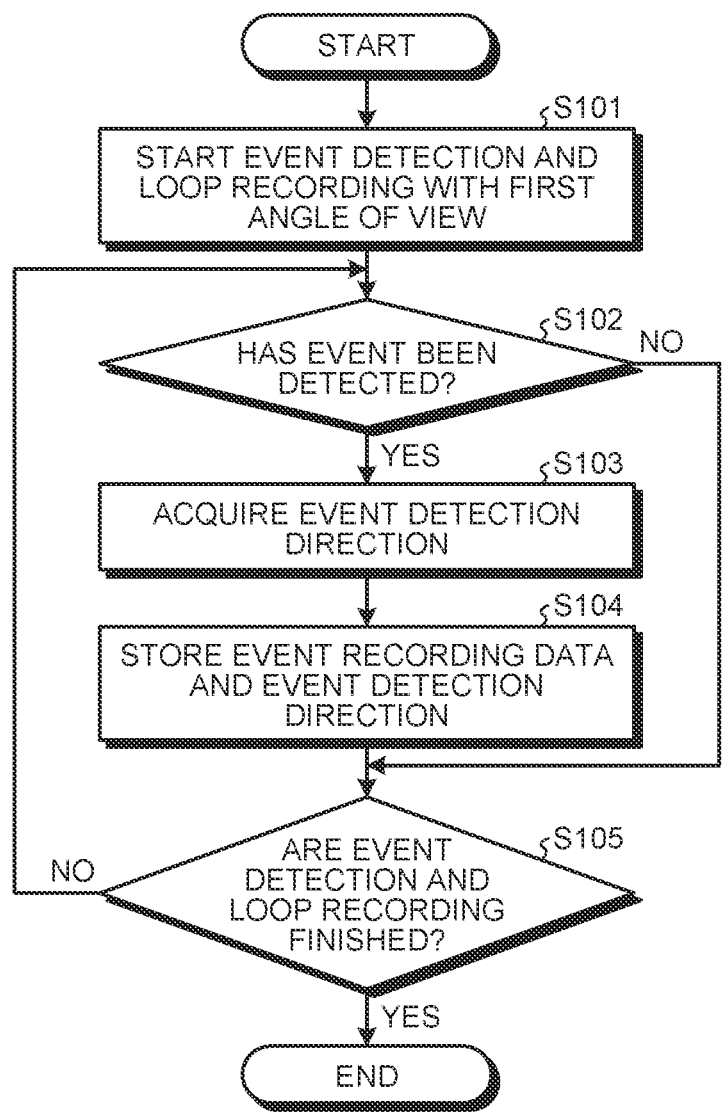
FIG. 9 is a flowchart illustrating flow of recording processing in the record-and-replay control device in the first embodiment.

Next, flow of recording processing in the record-and-replay control device 100 will be described with reference to FIG. 9. FIG. 9 is a flowchart illustrating the flow of the recording processing in the record-and-replay control device in the first embodiment. Loop recording processing is performed in this example.

The record-and-replay control device 100 starts event detection and loop recording with the first angle of view (step S101). To be more specific, the record-and-replay control device 100 detects an event based on a detection result of the acceleration sensor 250 by the event detector 127. The record-and-replay control device 100 generates, by the video data processor 122, pieces of loop recording video data of respective videos for every predetermined period from video data recorded in the buffer memory 121. The record-and-replay control device 100 controls to record the pieces of loop recording video data in the recording unit 220 by the recording controller 123. The record-and-replay control device 100 proceeds to step S102.

The record-and-replay control device 100 determines whether the event detector 127 has detected an event (step S102). To be more specific, the record-and-replay control device 100 proceeds to step S103 when the event detector 127 has detected the event (Yes at step S102). The record-and-replay control device 100 proceeds to step S105 when the event detector 127 has not detected the event (No at step S102).

When the event has been detected (Yes at step S102), the record-and-replay control device 100 acquires an event detection direction by the event detection direction acquisition unit 129 (step S103). The record-and-replay control device 100 proceeds to step S104.

The record-and-replay control device 100 stores event recording data being the video data before and after the event detection and the event detection direction (step S104). To be more specific, the record-and-replay control device 100 generates, as the event recording data, the video data containing at least an event occurrence time point from the pieces of loop recording video data recorded in the recording unit 220 by the video data processor 122. The record-and-replay control device 100 stores the event recording data in the recording unit 220 by the recording controller 123. The record-and-replay control device 100 stores information indicating the event detection direction together with the event recording data. The record-and-replay control device 100 proceeds to step S105. When the event detection direction cannot be acquired even with detection of the event at step S103, the event recording data is stored without acquisition of the event detection direction at step S104.

The record-and-replay control device 100 determines whether the event detection and the loop recording are finished (step S105). To be more specific, the record-and-replay control device 100 determines that the event detection and the loop recording are finished with a desired condition such as output of finish operation information or finish of action of the vehicle (Yes at step S105), and finishes the processing. When the operation controller 125 outputs no finish operation information, the record-and-replay control device 100 determines that the event detection and the loop recording are not finished (No at step S105) and executes the processing at step S102 again.

Figure 10:
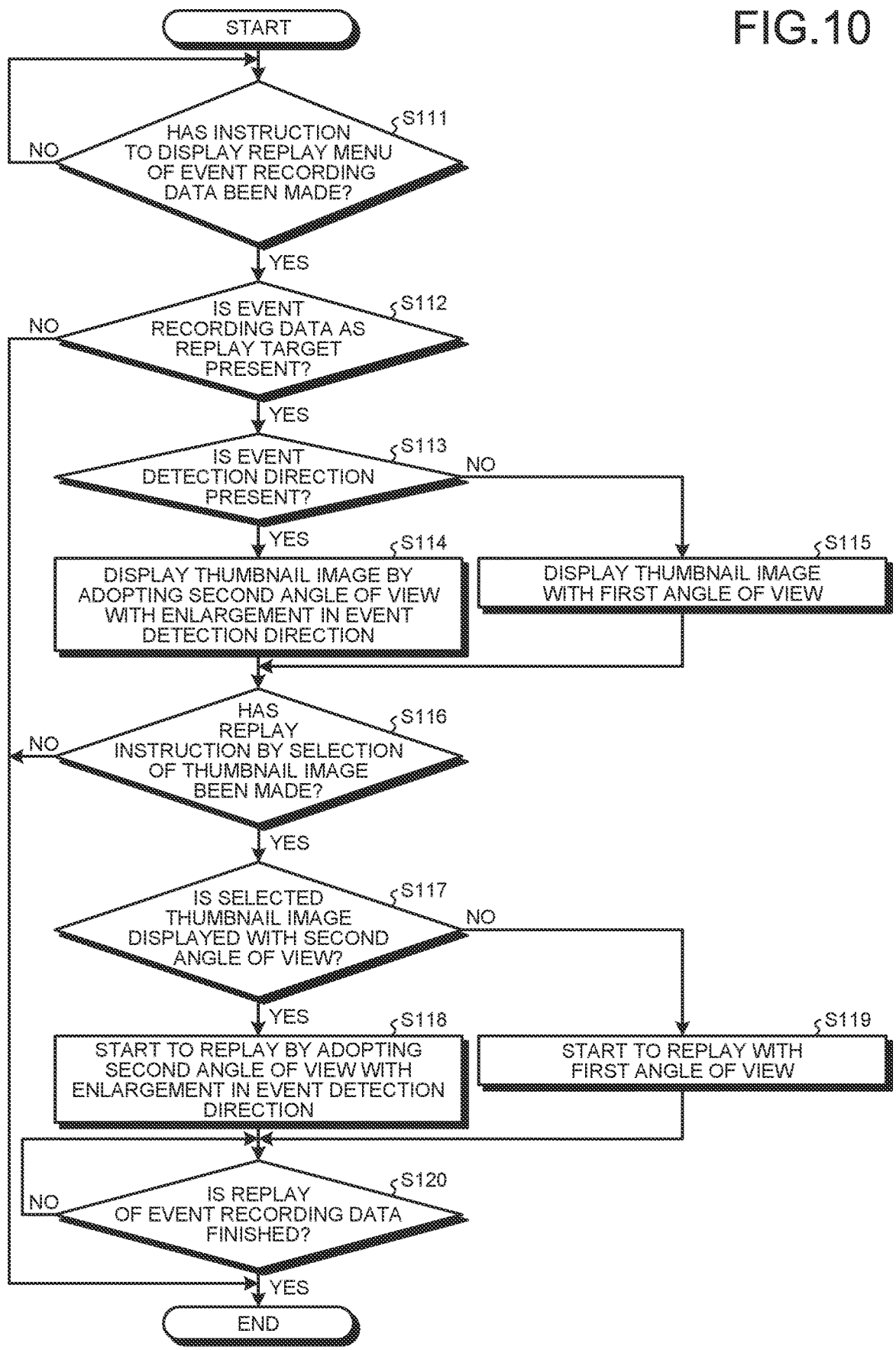
FIG. 10 is a flowchart illustrating flow of replay processing in the record-and-replay control device in the first embodiment.

Next, flow of replay processing in the record-and-replay control device 100 will be described with reference to FIG. 10. FIG. 10 is a flowchart illustrating the flow of the replay processing in the record-and-replay control device 100 in the first embodiment.

The record-and-replay control device 100 determines whether an instruction to display a replay menu of the event recording data has been made (step S111). When the operation controller 125 has acquired operation information indicating the instruction to display the replay menu of the event recording data, the record-and-replay control device 100 determines that the instruction to display the replay menu of the event recording data has been made (Yes at step S111) and proceeds to step S112. When the operation controller 125 has not acquired the operation information indicating the instruction to display the replay menu of the event recording data, the record-and-replay control device 100 determines that the instruction to display the replay menu of the event recording data has not been made (No at step S111) and executes the processing at step S111 again or may finish the processing.

When it is determined that the instruction to display the replay menu has been made (Yes at step S111), the record-and-replay control device 100 determines whether event recording data as a replay target is present (step S112). To be more specific, when the event recording data stored in the recording unit 220 is present, the record-and-replay control device 100 determines that the event recording data as the replay target is present (Yes at step S112) and proceeds to step S113. When the event recording data stored in the recording unit 220 is absent, the record-and-replay control device 100 determines that the event recording data as the replay target is absent (No at step S112) and finishes the processing.

When it is determined that the event recording data as the replay target is present (Yes at step S112), the record-and-replay control device 100 determines whether the event detection direction for the event recording data as the replay target is present (step S113). To be more specific, when information indicating the event detection direction is stored together with the event recording data as the replay target, the record-and-replay control device 100 determines that the event detection direction is present (Yes at step S113) and proceeds to step S114. When the information indicating the event detection direction is not stored together with the event recording data as the replay target, the record-and-replay control device 100 determines that the event detection direction is absent (No at step S113) and proceeds to step S115. The record-and-replay control device 100 executes the pieces of processing at step S113 to step S115 for all of the pieces of event recording data as the replay targets acquired at step S112.

When it is determined that the event detection direction is present (Yes at step S113), the record-and-replay control device 100 displays a thumbnail image with the second angle of view with enlargement in the event detection direction (step S114). The record-and-replay control device 100 proceeds to step S116.

When it is determined that the event detection direction is absent (No at step S113), the record-and-replay control device 100 displays the thumbnail image with the first angle of view (step S115). The record-and-replay control device 100 proceeds to step S116.

The record-and-replay control device 100 executes the pieces of processing at step S113 to step S115 for the pieces of event recording data as the replay targets acquired at step S112 and proceeds to step S116.

The record-and-replay control device 100 determines whether a replay instruction by selection of a thumbnail image has been made (step S116). When the operation controller 125 has acquired operation information indicating the replay instruction by selection of the thumbnail image, the record-and-replay control device 100 determines that the replay instruction by selection of the thumbnail image has been made (Yes at step S116) and proceeds to step S117. When the operation controller 125 has not acquired the operation information indicating the replay instruction by selection of the thumbnail image, the record-and-replay control device 100 determines that the replay instruction by selection of the thumbnail image has not been made (No at step S116) and finishes the processing.

When it is determined that the replay instruction by selection of the thumbnail image has been made (Yes at step S116), the record-and-replay control device 100 determines whether the selected thumbnail image is the thumbnail image displayed with the second angle of view (step S117). In other words, the record-and-replay control device 100 determines whether the selected thumbnail image is the thumbnail image indicating the event recording data with the information indicating the event detection direction. To be more specific, when it is determined that the selected thumbnail image is the thumbnail image displayed with the second angle of view (Yes at step S117), the record-and-replay control device 100 proceeds to step S118. When it is not determined that the selected thumbnail image is the thumbnail image displayed with the second angle of view (No at step S117), the record-and-replay control device 100 proceeds to step S119.

When it is determined that the selected thumbnail image is the thumbnail image displayed with the second angle of view (Yes at step S117), the record-and-replay control device 100 starts replay of the event recording data indicated by the selected thumbnail image and displays the replayed event recording data with the second angle of view with enlargement in the event detection direction (step S118). The record-and-replay control device 100 proceeds to step S120.

When it is not determined that the selected thumbnail image is the thumbnail image displayed with the second angle of view (No at step S117), the record-and-replay control device 100 starts replay of the event recording data indicated by the selected thumbnail image and displays the replayed event recording data with the first angle of view (step S119). The record-and-replay control device 100 proceeds to step S120.

The record-and-replay control device 100 determines whether replay of the event recording data is finished (step S120). When the event recording data has been replayed to the last or when an operation of stopping the replay has been made, the record-and-replay control device 100 determines that replay of the event recording data is finished (Yes at step S120) and finishes the processing. When the above-mentioned cases do not apply, the record-and-replay control device 100 determines that replay of the event recording data is not finished (No at step S120) and executes the processing at step S120 again.

In the above-mentioned manner, the thumbnail image with the event detection direction is displayed, on the display unit 240, as the thumbnail image obtained by adopting the second angle of view with enlargement in the event detection direction. When the thumbnail image with the event detection direction is selected, the corresponding event recording data is replayed and displayed with the second angle of view on the display unit 240. The thumbnail image with no event detection direction is displayed as the thumbnail image with the first angle of view on the display unit 240. When the thumbnail image with no event detection direction is selected, the corresponding event recording data is replayed and displayed with the first angle of view on the display unit 240.

As described above, in the embodiment, the display controller 126 can control to display, on the display unit 240, the thumbnail image with the event detection direction as the thumbnail image obtained by adopting the second angle of view with enlargement in the event detection direction. In the embodiment, the thumbnail image with the event detection direction is enlarged in the event detection direction, so that a capturing target object related to the event can be easily found from the thumbnail images. In the embodiment, the thumbnail image with the event detection direction is enlarged and displayed, so that the thumbnail image indicating desired event recording data can be easily found. In the embodiment, when the thumbnail image with the event detection direction is selected, the display controller 126 can control to replay the corresponding event recording data and display it with the second angle of view on the display unit 240. In the embodiment, when the enlarged thumbnail image is selected, it is replayed while being enlarged in the event detection direction, so that a state or the like of the capturing target object related to the event can be easily checked from the event recording data. According to the embodiment, the state of the event can be thus appropriately checked.

In the embodiment, the thumbnail image with no event detection direction can be displayed by the display controller 126, on the display unit 240, as the thumbnail image with the first angle of view. In the embodiment, when the thumbnail image with no event detection direction is selected and the corresponding event recording data is replayed, it can be displayed with the first angle of view on the display unit 240.

Second Embodiment

Figure 11:
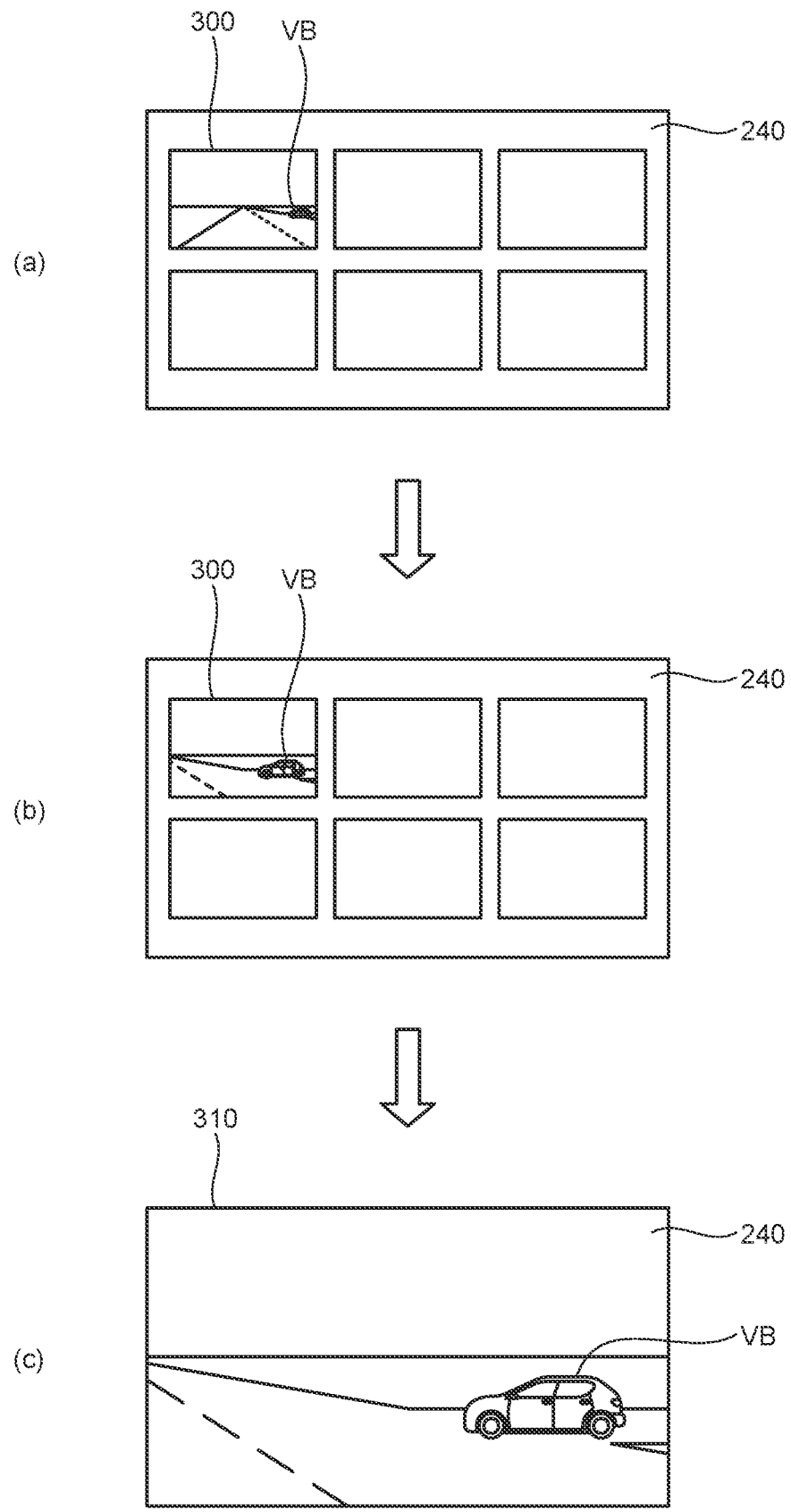
FIG. 11 is a view illustrating still another example of the thumbnail images and still another example of the event recording data displayed on the display unit.
Figure 12:
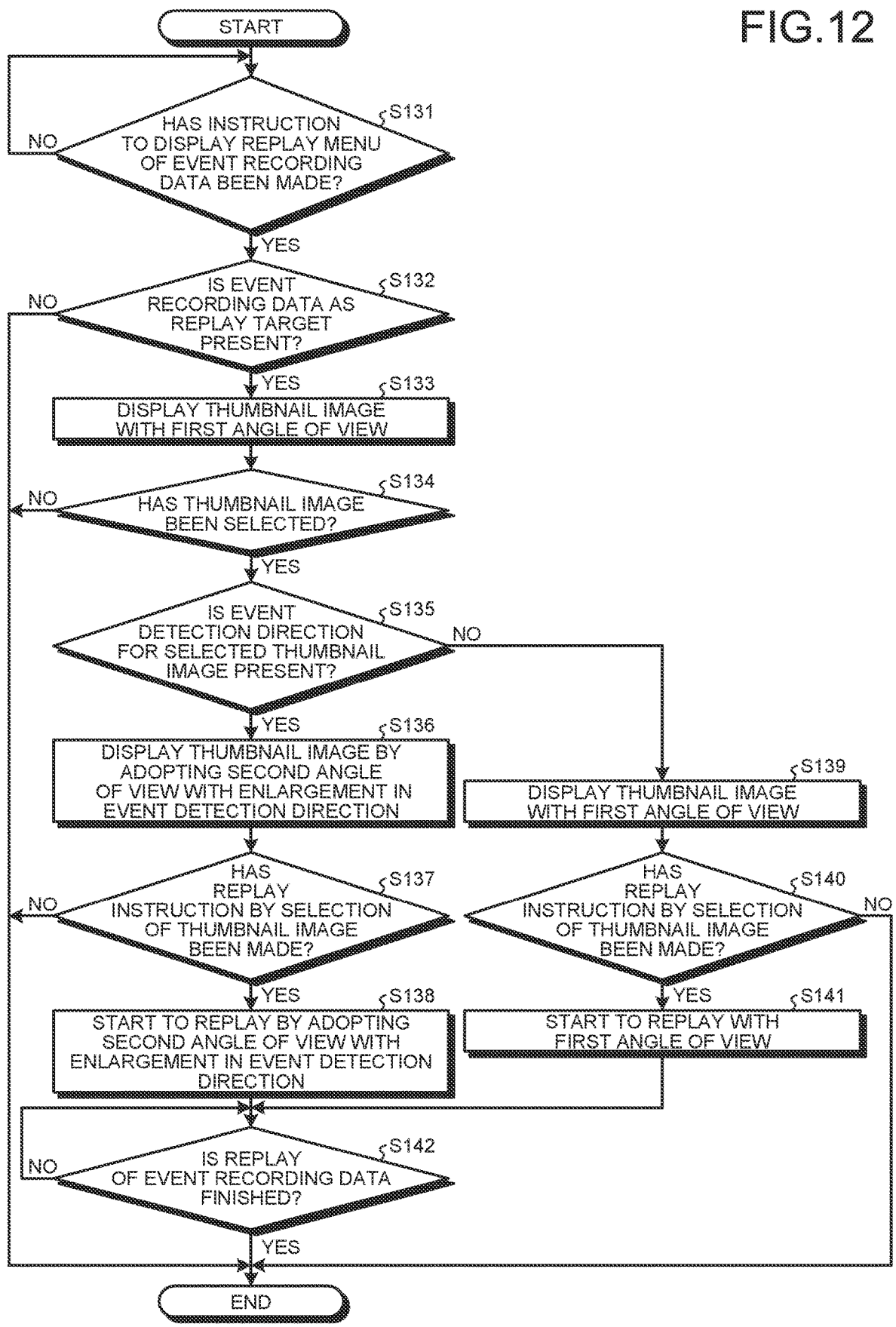
FIG. 12 is a flowchart illustrating flow of replay processing in a record-and-replay control device according to a second embodiment.

A vehicle record-and-replay device 10 according to the embodiment will be described with reference to FIG. 11 and FIG. 12. FIG. 11 is a view illustrating still another example of the thumbnail images and still another example of the event recording data displayed on the display unit. FIG. 12 is a flowchart illustrating flow of replay processing in a record-and-replay control device according to the second embodiment. The basic configuration of this vehicle record-and-replay device 10 is similar to that of the vehicle record-and-replay device 10 according to the first embodiment. In the following description, the same reference numerals or corresponding reference numerals denote similar components to those of the vehicle record-and-replay device 10 according to the first embodiment, and detail description thereof is omitted. In the vehicle record-and-replay device 10, processing in the display controller 126 is different from that in the first embodiment.

The display controller 126 controls to display event recording data as a replay target as a thumbnail image with the first angle of view. When the thumbnail image with the first angle of view is selected, the display controller 126 controls to display the selected thumbnail image as a thumbnail image with the second angle of view. To be more specific, when the event detection direction of the event recording data indicated by the selected thumbnail image with the first angle of view has been acquired, the display controller 126 controls to display the selected thumbnail image as the thumbnail image with the second angle of view. When the event detection direction of the event recording data indicated by the selected thumbnail image with the first angle of view has not been acquired, the display controller 126 controls to display the selected thumbnail image as the thumbnail image with the first angle of view.

The thumbnail images 300 and the event recording data 310 that are displayed on the display unit 240 by the display controller 126 when the event detection direction has been acquired will be described with reference to FIG. 11. As illustrated in (a) of FIG. 11, the display controller 126 controls to display, on the display unit 240, the thumbnail images 300 with the first angle of view that indicate the pieces of event recording data 310. The thumbnail image 300 at an upper left position in (a) of FIG. 11 is displayed at the same angle of view as that of the thumbnail image 300 at the upper left position in (a) of FIG. 4. When the thumbnail image 300 with the event detection direction at the upper left position in (a) of FIG. 11 is selected, as illustrated in (b) of FIG. 11, the display controller 126 controls to display, on the display unit 240, the selected thumbnail image 300 with the second angle of view. The thumbnail image 300 at an upper left position in (b) of FIG. 11 is displayed with the same angle of view as that of the thumbnail image 300 at the upper left position in (a) of FIG. 5. With a replay instruction in a state where the thumbnail image 300 with the event detection direction at the upper left position in (b) of FIG. 11 is selected, as illustrated in (c) of FIG. 11, the display controller 126 controls to replay the event recording data 310 corresponding to the selected thumbnail image 300 and display it with the second angle of view on the display unit 240. The event recording data 310 in (c) of FIG. 11 is displayed with the same angle of view as the event recording data 310 in (b) of FIG. 5.

Next, flow of processing in the record-and-replay control device 100 will be described with reference to FIG. 12. At step S131, step S132, step S133, step S136, step S137, step S138, step S139, step S140, step S141, and step S142, pieces of processing similar to the pieces of processing at step S111, step S112, step S115, step S114, step S116, step S118, step S115, step S116, step S119, and step S120 in the flowchart illustrated in FIG. 10 are performed.

The record-and-replay control device 100 determines whether a thumbnail image has been selected (step S134). When the operation controller 125 has acquired operation information indicating selection of the thumbnail image, the record-and-replay control device 100 determines that the thumbnail image has been selected (Yes at step S134) and proceeds to step S135. When the operation controller 125 has not acquired the operation information indicating selection of the thumbnail image, the record-and-replay control device 100 determines that the thumbnail image has not been selected (No at step S134) and finishes the processing.

When it is determined that the thumbnail image has been selected (Yes at step S134), the record-and-replay control device 100 determines whether the event detection direction for the selected thumbnail image is present (step S135). To be more specific, when information indicating the event detection direction is stored together with the event recording data indicated by the thumbnail image, the record-and-replay control device 100 determines that the event detection direction is present (Yes at step S135) and proceeds to step S136. When the information indicating the event detection direction is not stored together with the event recording data indicated by the thumbnail image, the record-and-replay control device 100 determines that the event detection direction is absent (No at step S135) and proceeds to step S139.

In the above-mentioned manner, the event recording data as the replay target is displayed as the thumbnail image with the first angle of view. When the thumbnail image with the first angle of view is selected and the selected thumbnail image has the event detection direction, it is displayed as the thumbnail image as the second angle of view.

As described above, in the embodiment, when the thumbnail image with the first angle of view is selected and the selected thumbnail image has the event detection direction, the display controller 126 can control to display it as the thumbnail image with the second angle of view.

In the embodiment, the thumbnail image indicating the event recording data as the replay target is displayed with the first angle of view. When the thumbnail image is selected, the thumbnail image is displayed with the second angle of view. In the embodiment, the thumbnail image can thereby be checked with the first angle of view and the second angle of view, so that the thumbnail image indicating desired event recording data can be found more appropriately.

Third Embodiment

Figure 13:
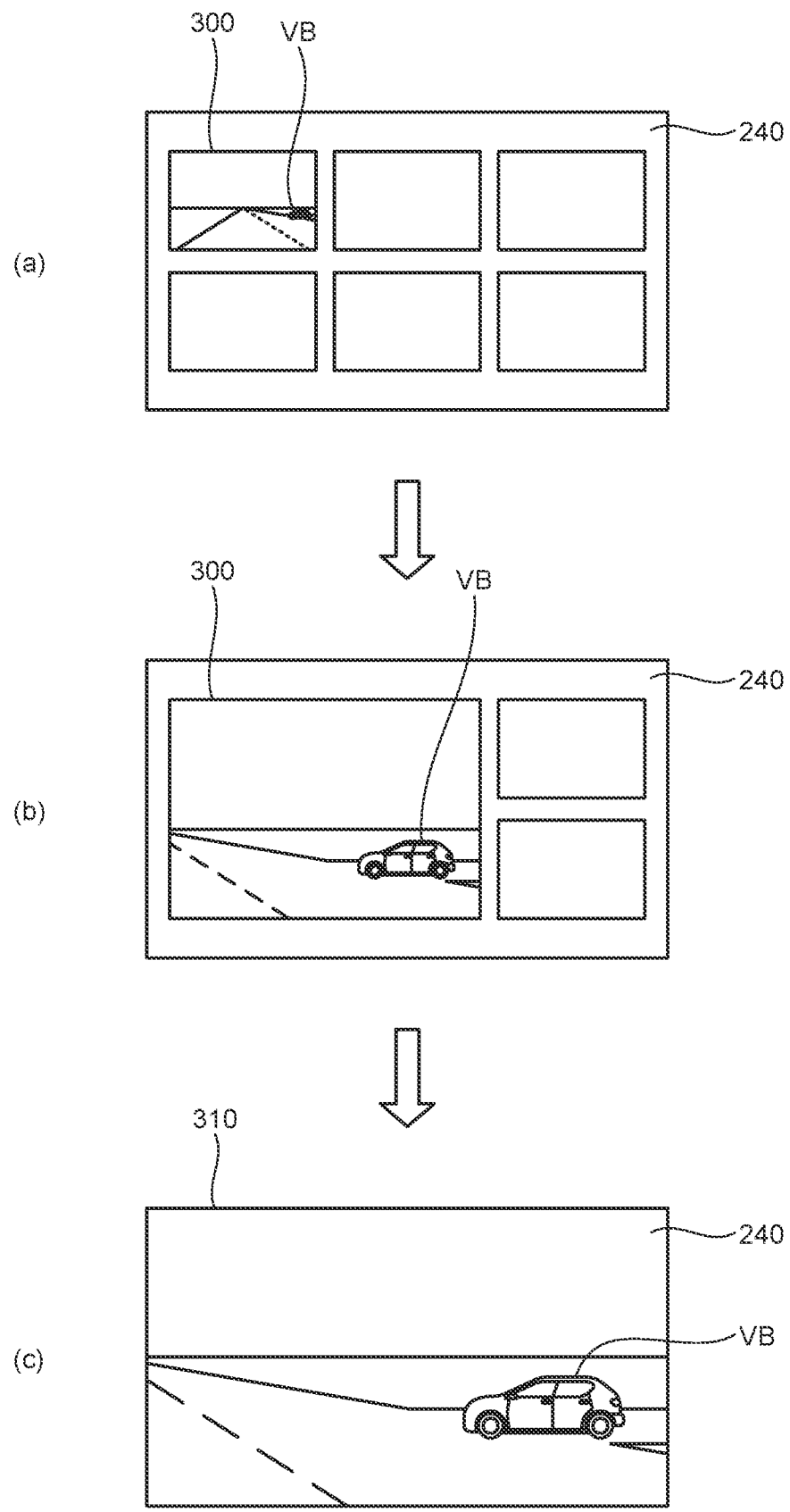
FIG. 13 is a view illustrating still another example of the thumbnail images and still another example of the event recording data displayed on the display unit.
Figure 14:
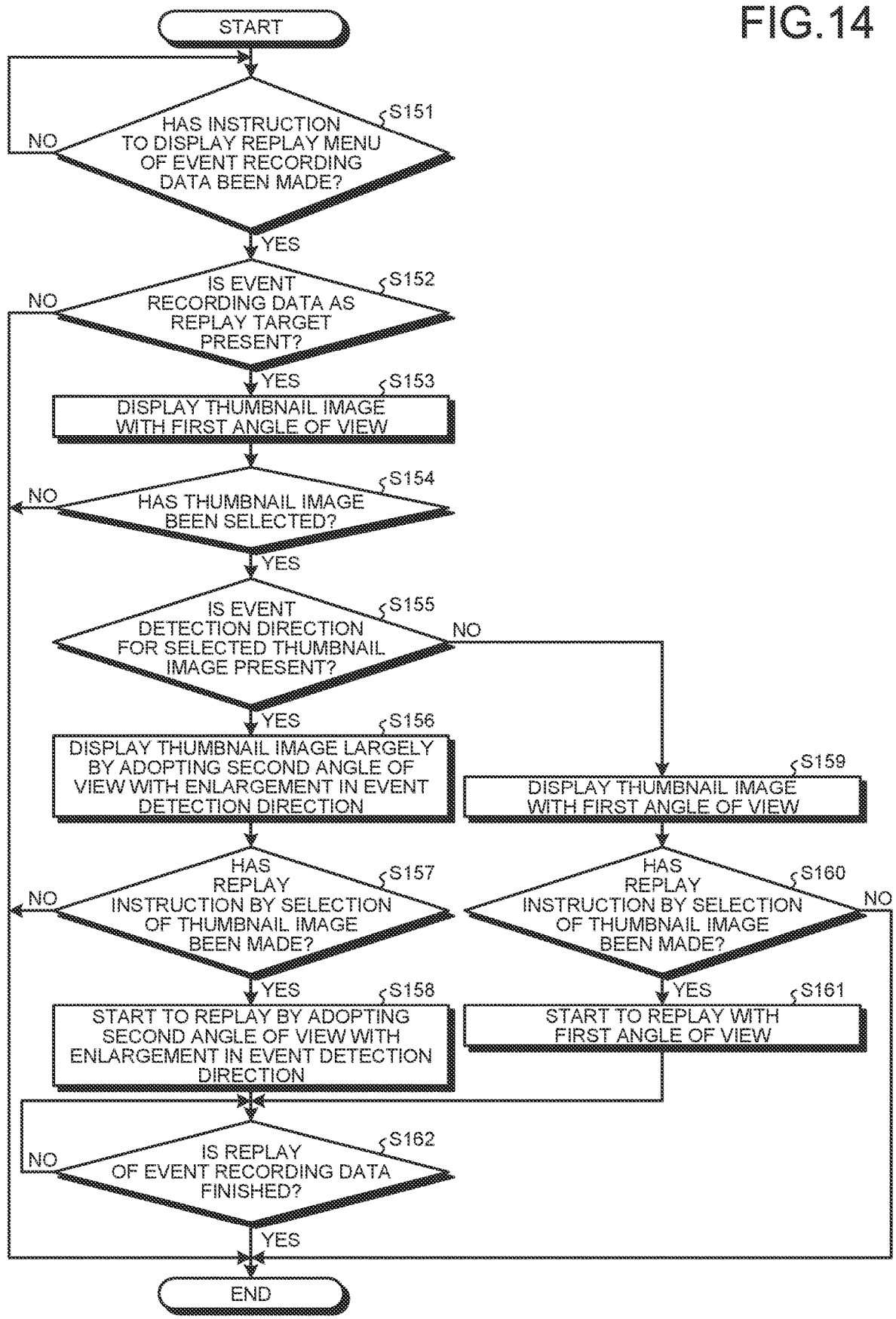
FIG. 14 is a flowchart illustrating flow of replay processing in a record-and-replay control device according to a third embodiment.

A vehicle record-and-replay device 10 according to the embodiment will be described with reference to FIG. 13 and FIG. 14. FIG. 13 is a view illustrating still another example of the thumbnail images and still another example of the event recording data displayed on the display unit. FIG. 14 is a flowchart illustrating flow of replay processing in a record-and-replay control device according to the third embodiment. The basic configuration of the vehicle record-and-replay device 10 is similar to that of the vehicle record-and-replay device 10 according to the second embodiment. In the vehicle record-and-replay device 10, processing in the display controller 126 is different from that in the second embodiment.

When a thumbnail image is selected, the display controller 126 controls to display the selected thumbnail image as a thumbnail image having an increased display area with the second angle of view. To be more specific, when the event detection direction of the event recording data indicated by the selected thumbnail image has been acquired, the display controller 126 controls to display the selected thumbnail image as the thumbnail image with the second angle of view while increasing the display area thereof. In the embodiment, the thumbnail image is enlarged to have an area for four thumbnail images before enlargement. When the event detection direction of the event recording data indicated by the selected thumbnail image has not been acquired, the display controller 126 controls to display the selected thumbnail image as the thumbnail image with the first angle of view.

The thumbnail images 300 and the event recording data 310 that are displayed on the display unit 240 by the display controller 126 when the event detection direction has been acquired will be described with reference to FIG. 13. As illustrated in (a) of FIG. 13, the display controller 126 controls to display, on the display unit 240, the thumbnail images 300 indicating the pieces of event recording data 310 with the first angle of view. When the thumbnail image 300 with the event detection direction at an upper left position in (a) of FIG. 13 is selected, as illustrated in (b) of FIG. 13, the display controller 126 controls to display, on the display unit 240, the selected thumbnail image 300 with the second angle of view with enlargement to have the display area for four thumbnail images 300 in (a) of FIG. 13. With a replay instruction in a state where the thumbnail image 300 with the event detection direction at the upper left position in (b) of FIG. 13 is selected, as illustrated in (c) of FIG. 13, the display controller 126 controls to replay the event recording data 310 corresponding to the selected thumbnail image 300 and display it with the second angle of view on the display unit 240.

Next, flow of processing in the record-and-replay control device 100 will be described with reference to FIG. 14. At step S151 to S155 and step S157 to step S162, pieces of processing similar to the pieces of processing at step S131 to S135 and step S137 to step S142 in the flowchart illustrated in FIG. 12 are performed.

The record-and-replay control device 100 displays the thumbnail image largely by adopting the second angle of view with enlargement in the event detection direction (step S156). The record-and-replay control device 100 proceeds to step S157.

In the above-mentioned manner, when the thumbnail image with the event detection direction is selected, the selected thumbnail image is displayed as the thumbnail image having the increased display area with the second angle of view.

As described above, in the embodiment, when the thumbnail image with the event detection direction is selected, the display controller 126 can control to display, with the second angle of view, the selected thumbnail image as the thumbnail image having the increased display area. In the embodiment, the thumbnail image indicating desired event recording data can thereby be found more appropriately.

Fourth Embodiment

Figure 15:
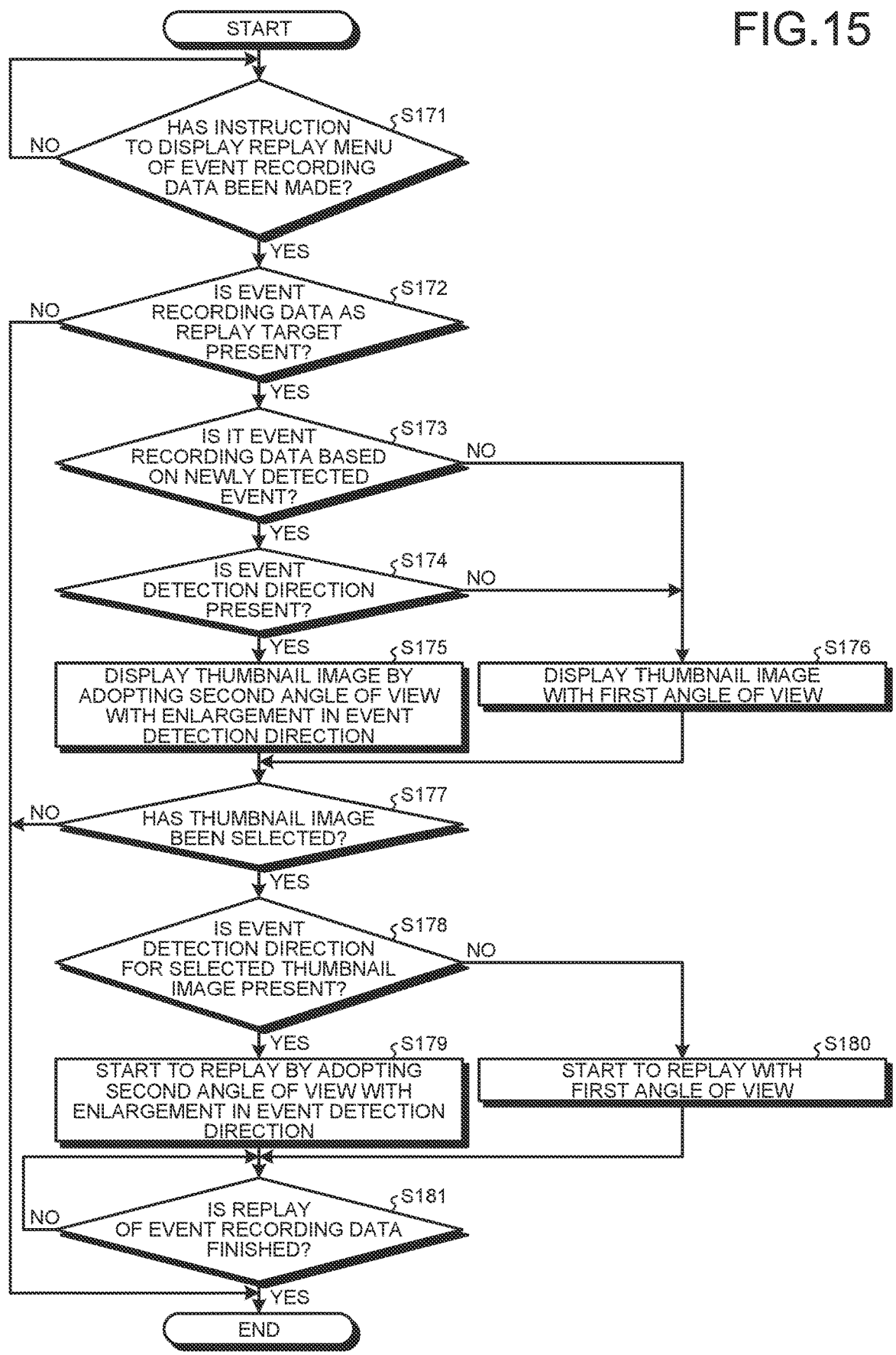
FIG. 15 is a flowchart illustrating flow of replay processing in a record-and-replay control device according to a fourth embodiment.

A vehicle record-and-replay device 10 according to the embodiment will be described with reference to FIG. 15. FIG. 15 is a flowchart illustrating flow of replay processing in a record-and-replay control device according to the fourth embodiment. The basic configuration of the vehicle record-and-replay device 10 is similar to that of the vehicle record-and-replay device 10 according to the first embodiment. In the vehicle record-and-replay device 10, processing in the display controller 126 is different from that in the second embodiment.

The display controller 126 controls to display a thumbnail image(s) indicating (pieces of) event recording data based on a newly detected event as a thumbnail image(s) with the second angle of view.

The event recording data based on the newly detected event may be one piece of event recording data that is the latest and is stored most recently or may be a plurality of pieces of event recording data that are newly stored in order. Alternatively, the event recording data based on the newly detected event may be, for example, event recording data stored within a predetermined period of time of about several hours.

Next, flow of processing in the record-and-replay control device 100 will be described with reference to FIG. 15. At step S171, step S172, step S174 to step S176, and step S181, pieces of processing similar to the pieces of processing at step S111, step S112, step S113 to step S115, and step S120 in the flowchart illustrated in FIG. 10 are performed. At step S177, step S178, step S179, and step S180, pieces of processing similar to the pieces of processing at step S134, step S135, step S138, and step S141 in the flowchart illustrated in FIG. 12 are performed.

When it is determined that the event recording data as the replay target is present (Yes at step S172), the record-and-replay control device 100 determines whether the event recording data is based on a newly detected event (step S173). When it is determined that the event recording data is based on the newly detected event (Yes at step S173), the record-and-replay control device 100 proceeds to step S174. When it is determined that the event recording data is not based on the newly detected event (No at step S173), the record-and-replay control device 100 proceeds to step S176.

In the above-mentioned manner, the thumbnail image indicating the event recording data based on the newly detected event is displayed as the thumbnail image with the second angle of view.

As described above, in the embodiment, the thumbnail image indicating the event recording data based on the newly detected event can be displayed as the thumbnail image with the second angle of view. In the embodiment, when a user checks the event recording data immediately after occurrence of the event, for example, the thumbnail image indicating desired event recording data can be found more appropriately.

Fifth Embodiment

Figure 16:
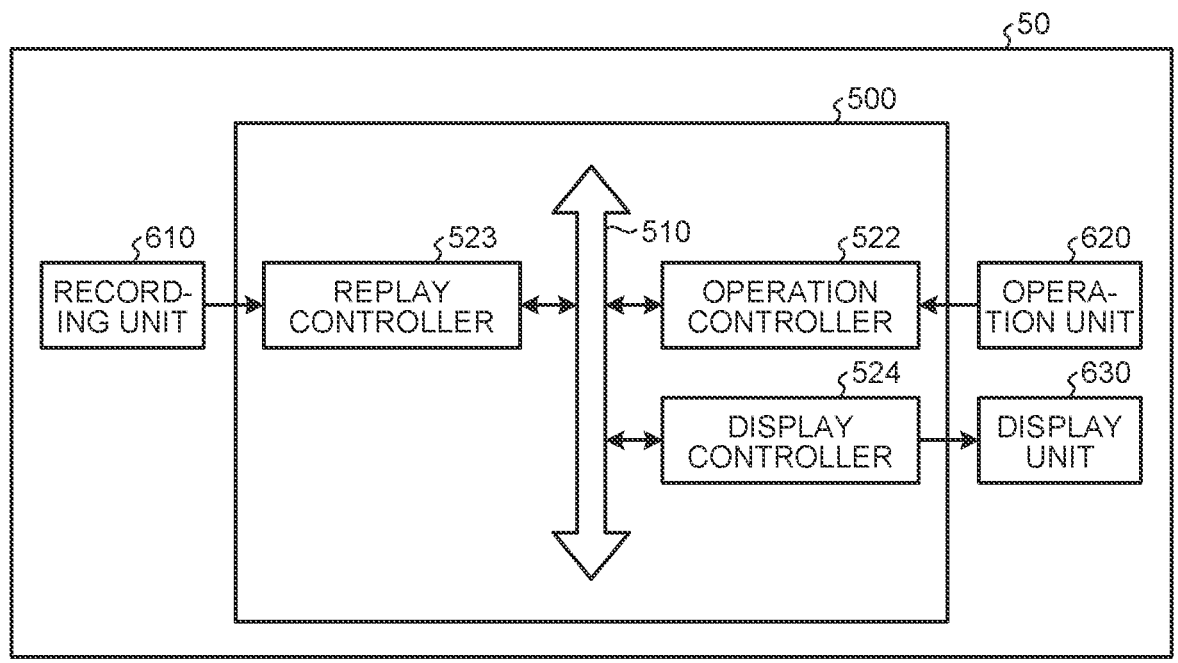
FIG. 16 is a block diagram illustrating an example of the configuration of a replay device including a replay control device according to a fifth embodiment.

A replay device 50 including a replay control device 500 according to the embodiment will be described with reference to FIG. 16. FIG. 16 is a block diagram illustrating an example of the configuration of the replay device including the replay control device according to the fifth embodiment.

The replay device 50 displays a thumbnail image with a second angle of view narrower than a first angle of view, the thumbnail image being provided by enlarging, in an event detection direction, a thumbnail image of event recording data with the first angle of view that is formed by recording an event. The replay device 50 is, for example, an electronic device including a personal computer, a smartphone, and a tablet. The replay device 50 includes a recording unit 610, an operation unit 620, a display unit 630, and the replay control device 500.

The recording unit 610 records therein the event recording data, information indicating the event detection direction, loop recording data, and the like by the vehicle record-and-replay device 10. The recording unit 610 is, for example, a semiconductor memory device such as a flash memory or a memory card. Alternatively, the recording unit 610 may be an external recording unit that is wirelessly connected to the replay device 50 via a communication device (not illustrated).

The operation unit 620 can receive various operations on the replay device 50. For example, the operation unit 620 can receive an operation of replaying the event recording data or the loop recording data recorded in the recording unit 610. For example, the operation unit 620 can receive an operation of deleting the event recording data recorded in the recording unit 610. The operation unit 620 outputs operation information to an operation controller 522 of the record-and-replay control device 500.

The operation unit 620 is a touchscreen included in the display unit 630. An operation of replaying the event recording data stored in the recording unit 610 is performed by touching the thumbnail image displayed on the display unit 630 to instruct selection and replay of the event recording data.

The display unit 630 is, for example, a display including a liquid crystal display or an organic EL display. The display unit 630 displays a video based on a video signal output from a display controller 524 of the replay control device 500. The display unit 630 displays the video recorded in the recording unit 610.

The replay control device 500 is, for example, an arithmetic processing device (control device) configured by a CPU or the like. The replay control device 500 loads a stored computer program on a memory and executes instructions contained in the computer program. The replay control device 500 includes an internal memory (not illustrated), and the internal memory is used for temporarily storing data in the replay control device 500. The replay control device 500 includes the operation controller 522, a replay controller 523, and the display controller 524 connected to a bus 510.

The operation controller 522 acquires operation information of an operation received by the operation unit 620. For example, the operation controller 522 acquires selection operation information indicating a selection operation of the video data, replay operation information indicating a replay operation of the video data, or deletion operation information indicating a deletion operation of the video data, and outputs a control signal. For example, the operation controller 522 acquires selection operation information indicating a selection operation of the thumbnail image displayed on the display unit 630 and outputs a control signal.

The replay controller 523 acquires the event recording data corresponding to the selected thumbnail image from the recording unit 610 and replays it. The replay controller 523 controls to replay the event recording data or the loop recording data recorded in the recording unit 610 based on a control signal of the selection operation and the replay operation, the control signal being output from the operation controller 522. When the information indicating the event detection direction corresponding to the selected event recording data is present, the replay controller 523 outputs the information indicating the event detection direction to the display controller 524.

The display controller 524 controls to display, on the display unit 630, a thumbnail image indicating event recording data as a thumbnail image obtained by adopting the second angle of view with enlargement in the event detection and display replayed event recording data on the display unit 630. When the event recording data selected using the thumbnail image with the second angle of view is replayed, the display controller 524 may control to display it with the second angle of view on the display unit 630.

When the display controller 524 controls to display the event recording data as a replay target as a thumbnail image with the first angle of view and the thumbnail image with the first angle of view is selected, the display controller 524 may control to display the selected thumbnail image as the thumbnail image with the second angle of view. To be more specific, the display controller 524 may perform similar processing to that by the display controller 126 in the second embodiment.

When the thumbnail image is selected, the display controller 524 may control to display the selected thumbnail image as a thumbnail image having an increased display area with the second angle of view. To be more specific, the display controller 524 may perform similar processing to that by the display controller 126 in the third embodiment.

The display controller 524 may control to display a thumbnail image(s) indicating (pieces of) event recording data based on a newly detected event as a thumbnail image(s) with the second angle of view. To be more specific, the display controller 524 may perform similar processing to that by the display controller 126 in the fourth embodiment.

In the above-mentioned manner, also in the replay device 50 that replays the video data stored by the vehicle record-and-replay device 10, similarly to the first embodiment to the fourth embodiment, the thumbnail image is displayed with the first angle of view or the second angle of view, and the replayed event recording data is displayed with the first angle of view or the second angle of view.

As described above, in the embodiment, also in the replay device 50 that replays the video data stored by the vehicle record-and-replay device 10, similarly to the first embodiment to the fourth embodiment, the thumbnail image can be displayed with the first angle of view or the second angle of view, and the event recording data can be replayed and displayed with the first angle of view or the second angle of view. According to the embodiment, the state of the event can be thus appropriately checked.

The vehicle record-and-replay device 10 and the replay device 50 according to the embodiments have been described above, and various different modes other than the above-mentioned embodiments may be employed.

The components of the illustrated vehicle record-and-replay device 10 and replay device 50 are functionally conceptual and may not be physically configured as illustrated in the drawings. That is to say, specific forms of the respective devices are not limited to those illustrated in the drawings, and all or some of them may be separated or integrated functionally or physically by a desired unit in accordance with processing burdens and usage conditions of each device.

The configurations of the vehicle record-and-replay device 10 and the replay device 50 are implemented by, for example, a computer program loaded on a memory as software. In the above-mentioned embodiments, they are functional blocks implemented by cooperation of hardware and software. That is to say, these functional blocks can be implemented in various forms by only hardware, only software, or combinations thereof.

The above-mentioned components include those that can be easily assumed by those skilled in the art and substantially the same components. Furthermore, the above-mentioned components can be appropriately combined. The configurations can be variously omitted, replaced, or changed in a range without departing from the gist of the embodiments.

Although the loop recording processing is performed in the above description, the same holds true for the case where capturing is started after detection of an event.

The record-and-replay control device, the replay control device, the record-and-replay control method, and the computer program according to the embodiments can be used for, for example, a vehicle record-and-replay device capable of displaying a thumbnail image indicating event recording data, what is called a dashboard camera.

The embodiment provides an effect that the state of the event can be appropriately checked.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A record-and-replay control device comprising:
an acceleration sensor configured to detect, as an event, a change in acceleration caused by impact to a vehicle;
a recording unit configured to store video data captured by an imaging unit configured to capture an image of outside of the vehicle, and store, as an event detection direction, a direction of the impact corresponding to the change in acceleration detected by the acceleration sensor;
a recording controller configured to store in the recording unit the video data associated with the event detection direction as event recording data with a first angle of view;
a replay controller configured to replay selected event recording data; and
a display controller configured to, in response to selection of a thumbnail image indicating the event recording data with the first angle of view, control a display unit to display the thumbnail image as a thumbnail image obtained by adopting a second angle of view directed to the event detection direction, the second angle of view being narrower than the first angle of view, and control the display unit to display the selected event recording data.

2. The record-and-replay control device according to claim 1, wherein the display controller controls to replay and display, with the second angle of view, the event recording data selected using the thumbnail image with the second angle of view.

3. The record-and-replay control device according to claim 1, wherein, in response to the selection of the thumbnail image, the display controller controls to display the thumbnail image as a thumbnail image having an increased display area with the second angle of view.

4. The record-and-replay control device according to claim 1, wherein the display controller controls to display, as the thumbnail image with the second angle of view, the thumbnail image indicating the event recording data based on the event detected within a recent predetermined period.

5. A replay control device comprising:
a replay controller configured to replay event recording data indicating video data captured with a first angle of view by an imaging unit configured to capture an image of outside of a vehicle, the event recording data being associated with an event detection direction indicating a direction of impact to the vehicle; and
a display controller configured to, in response to selection of a thumbnail image indicating the event recording data with the first angle of view, control a display unit to display the thumbnail image as a thumbnail image obtained by adopting a second angle of view directed to the event detection direction, the second angle of view being narrower than the first angle of view, and control the display unit to display the event recording data replayed by the replay controller.

6. A record-and-replay control method comprising:
acquiring video data captured by an imaging unit configured to capture an image of outside of a vehicle;
detecting, as an event a change in acceleration caused by impact to the vehicle;
acquiring, as an event detection direction, a direction of the impact corresponding to the change in acceleration;
storing in a recording unit the video data associated with the event detection direction as event recording data that is captured by the imaging unit with a first angle of view;
in response to selection of a thumbnail image indicating the event recording data with the first angle of view, displaying, on a display unit, the selected thumbnail image as a thumbnail image obtained by adopting a second angle of view directed to the event detection direction, the second angle of view being narrower than the first angle of view;
replaying the event recording data corresponding to a selected thumbnail image; and
displaying, on the display unit, the event recording data replayed at the replaying.

* * * * *